Feb. 1, 1949.  S. J. ERRETT  2,460,413
WELDER'S DOUBLE MITT
Filed June 11, 1945  2 Sheets-Sheet 1
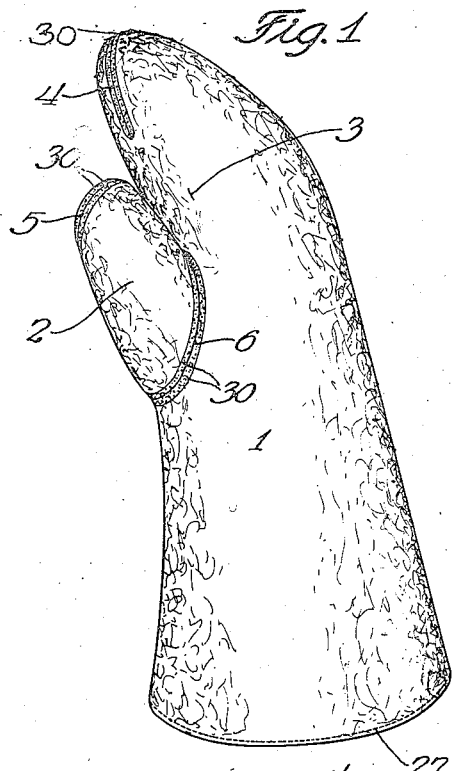
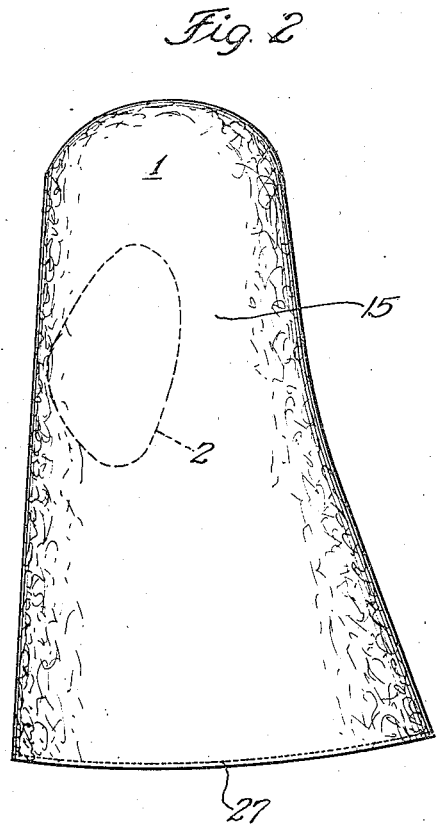
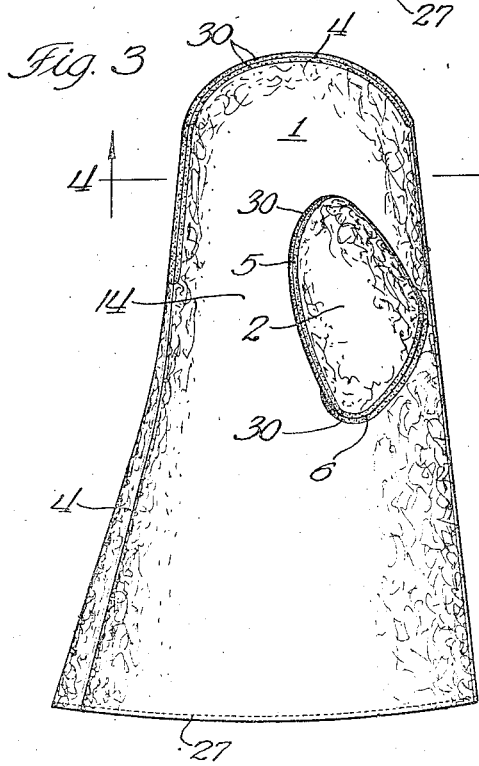
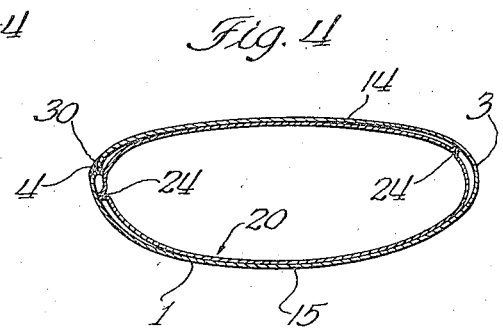
Sanford J. Errett
INVENTOR
BY
ATTORNEY Feb. 1, 1949.   S. J. ERRETT   2,460,413
WELDER'S DOUBLE MITT
Filed June 11, 1945   2 Sheets-Sheet 2
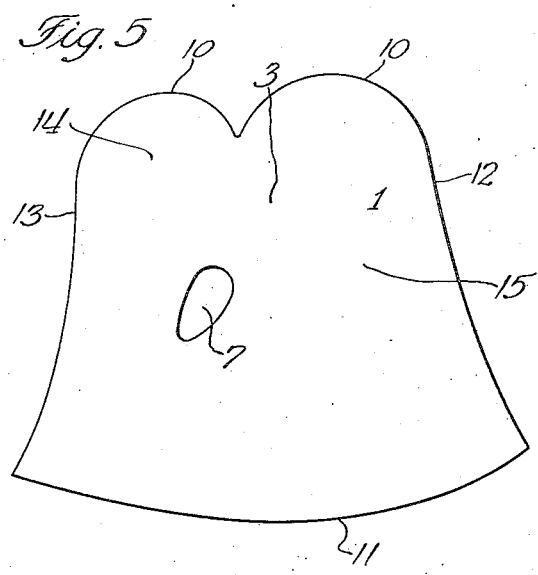
Fig. 5
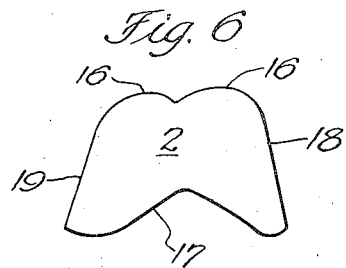
Fig. 6
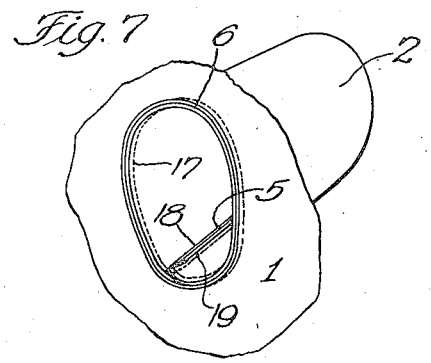
Fig. 7
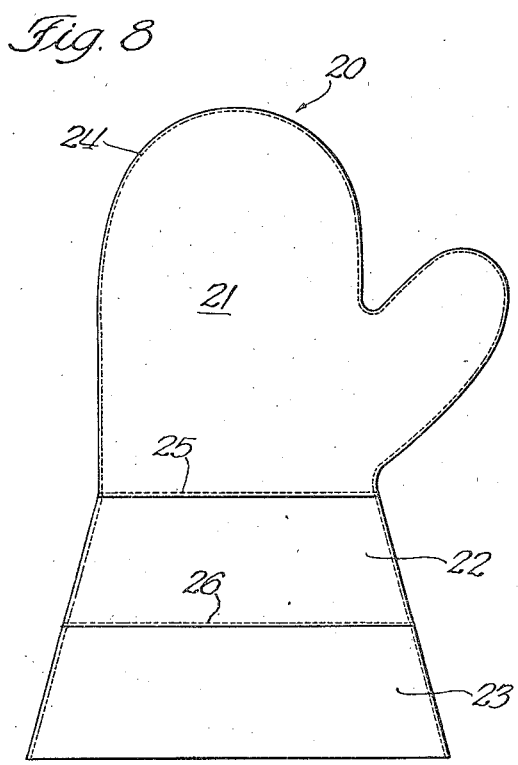
Fig. 8
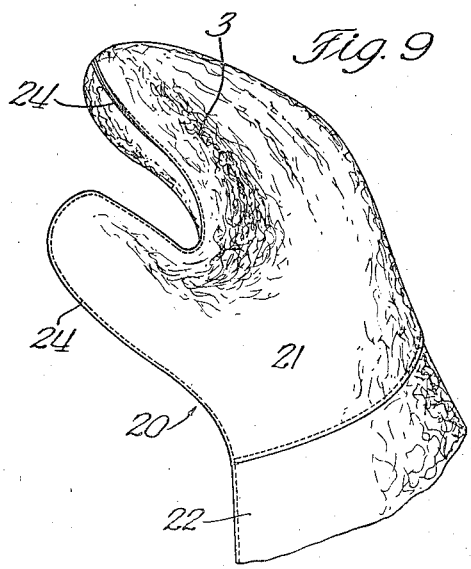
Fig. 9
Sanford J. Errett
INVENTOR
BY
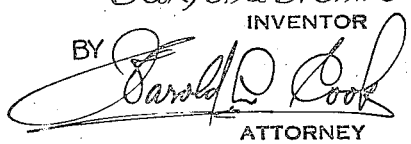
ATTORNEY Patented Feb. 1, 1949

2,460,413

UNITED STATES PATENT OFFICE 2,460,413

WELDER'S DOUBLE MITT

Sanford J. Errett, Portland, Oreg.

Application June 11, 1945, Serial No. 598,684

5 Claims. (Cl. 2—158)

This invention relates to a welder's mitt, and has particular reference to a double mitt having an outside leather shell and an inside leather liner.

The object of the invention, in general, is to overcome certain shortcomings in the mitts and gloves now in general use by welders. A principal objectionable feature in many of the mitts used by welders is the presence of a seam or seams extending along the outer edge of the forefinger and adjacent wrist or gauntlet portion. Such a seam is positioned on an upper side of the operator's hand, or on a side adjacent the weld, much of the time in a welding operation in the handling of the torch or welding rod. In this position sparks coming from the weld and comprising bits of burning and molten metal have a tendency to lodge in the seam and burn the mitt. Such lodging of sparks and molten metal in the seams has been a constant annoyance and danger to welders, and requires that they divert their attention from the weld to discover and remove the burning particles.

An additional objection to the usual seam extending along the forefinger is that it results in excessive wear where the seam contacts the welding torch or welding rod holder. It is the usual occurrence for such mitts to burn out along this seam, and for the seam to wear through at the point where the welding instrument is gripped, after a very short period of use and while the rest of the mitt is still in good condition. Conventional welding mitts usually have a short life for this reason, and must be discarded because of failure in this particular zone of weakness. Conventional mitts also frequently have other seams in the thumb or back portion of the hand or gauntlet parts which are brought into position to lodge sparks when the mitt is in use and are equally objectionable.

A primary object of the present invention, therefore, is to provide an improved welder's mitt in which there is no seam along the forefinger and adjoining wrist or gauntlet portion or over the back of the hand or gauntlet to lodge sparks or wear through from holding the welding instrument.

A further object is to provide a mitt of novel and improved construction which will require less skill and time in the assembling and sewing of the various elements than is usually necessary in making conventional gloves.

A further object is to provide an improved and more economical manner of cutting the blanks from which the mitt is made so that there will be less scrap, and so as to utilize many scraps which would ordinarily be discarded.

Another object is to provide a double mitt type of construction having a liner which may be used in either right or left outside shells to reduce the number of different pieces which must be cut in order to make right and left hand mitts of different sizes.

A still further object is to provide a welder's mitt in which the external seams are filled with a material which will prevent the lodging of sparks therein.

These and other objects will become apparent as the description proceeds in connection with the accompanying drawings illustrating a preferred embodiment of the invention:

In the drawings:

Figure 1 is a top view of a mitt constructed according to the present invention, showing it approximately as it would appear on a welder's hand while working.

Figure 2 is a view of the back side of the mitt lying flat.

Figure 3 is a view of the palm side of the mitt lying flat.

Figure 4 is a cross sectional view through the mitt, taken on the line 4—4 of Figure 3.

Figure 5 is a view of the blank for the outer shell hand portion.

Figure 6 is a view of the blank for the thumb for the outer shell.

Figure 7 is a fragmentary perspective view showing the manner in which the thumb is attached to the hand portion.

Figure 8 is a view of the liner lying flat.

Figure 9 is a view similar to Figure 1, but with the outer shell removed to show the manner in which the liner disposes itself upon the operator's hand in use.

The present mitt is made of double thickness of material throughout, having a right or left hand outer mitt, or shell, and an inner mitt, or liner, which is the same in both right and left hand mitts.

Referring first to the outer shell, it will be seen that this part of the mitt is made from two blanks, the numeral 1 designating the blank for the hand portion and the numeral 2 designating the blank for the thumb. These blanks are cut and fastened together in such a way that when the mitt is in use, as shown in Figure 1, the blank for the hand portion folds over the outside edge of the forefinger and adjoining portion of the operator's wrist so as to present no seam along this edge of the mitt. The numeral 3 indicates approximately the portion of the mitt contacted by the welding instrument where excessive wear is ordinarily occasioned if a seam is present. It will be observed that in the present construction no seam is sufficiently close to this region to be included in the operator's grip of the welding instrument. It will also be observed from Figure 1 that there is a minimum length of seam exposed on the upper sides of the mitt to intercept sparks from the work, the top and back sides presenting a generally smooth leather surface which does not hold sparks discharged thereagainst. The only seams accessible to sparks are a short length of the finger tip portion of a long seam 4, a short length of the thumb tip portion of the thumb seam 5, and a portion of the seam 6 uniting the thumb to the hand portion. Figure 2 illustrates the freedom of the entire back side of the mitt from seams so that as the operator's hand may occasionally be turned over to this position there is even less chance of sparks being retained in contact with the surface of the mitt. The novel shape of the blanks, the construction of these seams and the use of filling material to prevent the lodging of sparks will now be described with reference to the manner of making the mitt.

Figure 5 shows the blank for the hand portion 1 of an outer shell, this view being of the outside surface for a right hand glove. The parts of the blank 1 may be identified as a thumb hole 7, finger tip ends 10, a gauntlet end 11, and side edges 12 and 13. The portion of the blank which will engage the welding instrument when the completed mitt is in use is indicated by the reference numeral 3, corresponding to the portion similarly designated in Figure 1. For a right hand mitt the side 14 becomes the outside of the palm and the side 15 becomes the outside of the back portion, the side edges 12 and 13 and the finger tip ends 10 being fastened together to constitute the previously mentioned seam 4 on the little finger edge of the mitt. The mid portion of the blank between the thumb hole and the finger tip ends folds over to form the forefinger edge of the mitt.

The thumb blank 2, shown in Figure 6, has thumb tip ends 16, a thumb base end 17, and side edges 18 and 19. When the thumb is formed, the thumb tip ends 16 and the side edges 18 and 19 are united to form the previously mentioned seam 5. This is the first operation in making the mitt, the thumb being sewed inside out and then turned and inserted in the thumb hole 7 of the blank 1. Figure 7 shows the completed thumb after the seam 5 has been sewed and the thumb turned and sewed in place at the seam 6. Here the blank 1 is viewed from the inside, showing how the base edge 17 of the thumb 2 is matched with the marginal edge of the hole 7 so that the seam 6 can easily be sewed on conventional sewing machines without requiring great skill on the part of the operator. The sewing of the seam 6 is accomplished by laying the blank 1 back over the thumb so that the region of the seam is openly accessible.

After the thumb is sewed in place as shown in Figure 7, the seam 4 in the hand portion is sewed by a simple sewing machine operation with the mitt inside out and containing the thumb therewithin. In this manner the seam 4 is likewise a simple sewing machine operation not requiring especial skill or accuracy. The sewing of the seams 4, 5 and 6 in the manner described completes the outer shell which, when turned, will appear as shown in Figures 1 to 3.

The liner, indicated generally by the numeral 20, will now be described with reference to Figures 8 and 9. The hand portion of the liner comprises a pair of identical blanks 21, and the gauntlet portion is made of pairs of identical blanks in two sections 22 and 23, the latter being small pieces whereby they can be cut from scrap. The blanks 21 are united by a stitched seam 24 around their margins to form the hand portion which is then connected by means of lap seams 25 and 26 with the successive gauntlet sections. The liner 20 is made of relatively soft and pliable leather of the chamois type so that it will readily accommodate itself to the hand for either right or left hand use.

Figure 9 illustrates how the seam 24 twists along the forefinger to a position inside of the region 3 where the welding tool is gripped so that a smooth surface free of seams is pressed against the operator's hand at this point. When the liner is worn on the left hand, the seam 24 twists toward the palm side of the forefinger in the same manner to achieve the desired result.

The mitt is completed by sewing the liner into the outer shell, which may be effected by a simple marginal gauntlet seam 27. The liner is then easily removable so that it may be transferred to another shell, or from a right hand shell to a left hand shell, if desired, to avoid replacing both parts of the mitt when the outer shell is discarded.

Figure 4 illustrates by a cross sectional view how the seams 24 in the liner tend to twist in the manner previously described so that no seam whatsoever will be interposed between the operator's hand and the welding instrument in the grip region 3 between the forefinger and thumb. The seams 24 are thereby disposed in such positions that they will not cause annoyance or inconvenience to the operator, and the seam 4 in the outer shell is for the most part normally disposed on an underneath side of the glove away from the stream of sparks discharged from the weld.

An important feature of the present invention is the use of a filling material 30, such as beeswax, in all the outer seams of the mitt, with a particularly heavy filling in those portions of the seams exposed, as shown in Figure 1, on the top and back sides of the mitt. It is found that a coating of beeswax will cause welding sparks to glance off the surface and will be effective to prevent their adhering to any portion so coated. The presence of the filling material also tends to smooth the surface contour of the seam so as to leave no seam crevice to pinch and grip solid or molten particles moving across the surface. In this manner, those seams which must necessarily be presented in exposed positions are protected from the lodging of sparks so that the operator need not be concerned with this problem and may devote his entire attention and energy to his work.

Although in the preferred embodiment the seams are secured by sewing with thread, they also may be secured by vulcanizing or riveting the edges together. Riveting is entirely satisfactory because the filling material in the seams of the outer mitt effects a satisfactory closure without the necessity for continuous stitching. The term "seam" as used throughout the specification and claims is intended to include any of the seam lines in both the outer shell and the liner, regardless of whether the parts be fastened together by stitching, vulcanization, rivets, or other means. The present mitt is made in such a way that the seams are easily formed by any of these means without requiring a high degree of skill. This has the desirable result of practically eliminating culls in manufacture.

Various changes in the construction will occur to those skilled in the art, the present preferred embodiment being described by way of illustration only and not by way of limiting the invention. All such modifications are included in the invention, the same being limited only by the scope of the appended claims.

Having now described my invention and in what manner the same may be used, what I claim as new and desire to protect by Letters Patent is:

1. A welder's mitt comprising an outer shell having a hand portion with a smooth seamless surface over the back and palm and extending around the forefinger edge, a single seam extending only across the finger tip end and along the little finger edge, and a thumb attached to the palm side of said hand portion by means of a seam extending around the base of the thumb, said thumb having a smooth seamless inner edge surface and a seam extending across the thumb tip and down the outer edge of the thumb; and a liner comprising a pair of identical blanks fastened together by a marginal seam to make said liner usable with either right or left hand outer shells.

2. A welder's mitt comprising a smooth seamless piece of material forming the back, palm and forefinger edge of the hand portion to prevent the lodging of sparks, a single seam extending only across the finger tip end and along the little finger edge, and a thumb having a smooth seamless inner edge surface to prevent lodging of sparks, said thumb having a seam extending around its base and a seam extending across the thumb tip and down the outer edge of the thumb, each of said seams containing a filling material to fill the seam crevice to prevent the lodging of sparks in the seams, said filling material being applied only in said seams.

3. A welder's mitt having a smooth seamless leather surface over the back, palm and forefinger edge of the hand portion and around the inside edge of the thumb portion to prevent the lodging of sparks, a single seam extending only across the finger tip end and along the little finger edge, a thumb seam extending around the base of the thumb in the palm portion of the mitt, a thumb seam extending across the thumb tip and down the outer edge of the thumb, and a heavy coating of beeswax in said seams to fill the seam crevices to prevent the lodging of sparks therein.

4. A welder's mitt comprising a relatively heavy outer shell having a single smooth and seamless surface of material covering the palm and back sides of the hand portion and extending around the forefinger edge of the mitt, a thumb for said outer shell comprising a single smooth and seamless surface of material covering the palm and back sides of the thumb portion and extending around the inside edge of the thumb, said thumb being set into the palm side of said hand portion to fit only one hand of a wearer, and a liner of relatively soft material within said outer shell, said liner comprising two identical blanks fastened together by a marginal seam extending around the hand and thumb portions to make said liner usable with either right or left hand outer shells, whereby those parts of said marginal seam lying between the thumb and hand portions of said liner are twisted away from gripping areas of the mitt when a wearer's hand is curved to grip an object regardless of whether the liner is worn on the right or left hand.

5. A welder's mitt comprising a relatively heavy outer shell having a thumb portion set into a hand portion to fit only one hand of a wearer, said outer shell having smooth seamless surfaces extending around the forefinger edge of the hand portion and inside edge of the thumb portion to prevent the lodging of sparks, and a liner of relatively soft material having a thumb portion set for both right and left hand use, said liner being loosely disposed within said outer shell to accomplish itself to use in either right or left hand shells.

SANFORD J. ERRETT.

REFERENCES CITED

The following references are of record in the file of this patent:

UNITED STATES PATENTS

| Number | Name | Date |
|---|---|---|
| 60,949 | Smith | Jan. 1, 1867 |
| 151,460 | Whitten | May 26, 1874 |
| 532,880 | Hunicke | Jan. 22, 1895 |
| 666,853 | Morgan | Jan. 29, 1901 |
| 699,137 | Bertheau | May 6, 1902 |
| 770,670 | Brorby | Sept. 20, 1904 |
| 1,511,870 | Baskin | Oct. 14, 1924 |
| 2,219,501 | Wickman | Oct. 29, 1940 |
| 2,256,427 | Gitt | Sept. 16, 1941 |
| 2,304,137 | Peakes | Dec. 8, 1942 |

FOREIGN PATENTS

| Number | Country | Date |
|---|---|---|
| 76,944 | Sweden | Oct. 27, 1931 |